United States Patent [19]

Randell

[11] Patent Number: 4,963,631
[45] Date of Patent: Oct. 16, 1990

[54] POLYMERS

[75] Inventor: Donald R. Randell, Heaton Mersey, England

[73] Assignee: Ciba-Geigy Corporation, Ardsley, N.Y.

[21] Appl. No.: 322,608

[22] Filed: Mar. 13, 1989

[30] Foreign Application Priority Data

Mar. 22, 1988 [GB] United Kingdom ............... 8806802

[51] Int. Cl.$^5$ ............................................. C08F 30/04
[52] U.S. Cl. ................... 526/240; 526/318.2; 525/329.5; 525/329.6; 525/330.2
[58] Field of Search ............................ 526/240, 318.2; 525/329.5, 329.6, 330.2; 560/202; 252/151

[56] References Cited

U.S. PATENT DOCUMENTS 4,547,323 10/1985 Carlson ............................ 560/202

FOREIGN PATENT DOCUMENTS 0106110 4/1984 European Pat. Off. .
1170107 11/1969 United Kingdom .
1220476 1/1971 United Kingdom .

OTHER PUBLICATIONS

C.A. 82-113279j.
C.A. 80-97506.
C.A. 80-5003.

Primary Examiner—Joseph L. Schofer
Assistant Examiner—Thomas McDonald, Jr.
Attorney, Agent, or Firm—Stephen V. O'Brien

[57] ABSTRACT

The invention provides (co)polymers having the formula (I):

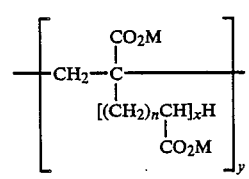

wherein
M is hydrogen, a metal ion or an ammonium cation;
x is 1, 2 or 3;
y is an integer from 2 to 100; and
n is 1, 2 or 3.

The (co)polymers of formula I are corrosion and/or scale inhibitors for the protection of metal surfaces in contact with water.

5 Claims, No Drawings

POLYMERS

The present invention relates to new (co)-polymers; to processes for their production; and to their use in the treatment of water.

The use of monomeric or polymeric carboxylic acids to control a particular form of scale depostion onto and/or corrosion of metal surfaces in contact with water, is well-known. Less familiar are additives which control metal corrosion and, simultaneously, deposition of scale of more than one type.

We have now found a new class of (co)-polymers which exhibits good corrosion inhibition properties and which assists in the control of several different types of alkaline earth metal scale e.g. calcium carbonate, calcium sulphate and barium sulphate scale.

Accordingly, the present invention provides (co)-polymers having the formula (I):

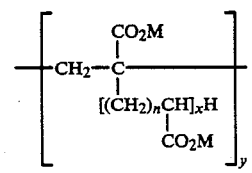

wherein
M is hydrogen, a metal ion or an ammonium cation;
x is 1, 2 or 3;
y is an integer from 2 to 100;
n is 1, 2 or 3.

M is preferably, in case of a metal ion, an alkali metal or an alkaline earth metal and especially sodium or potassium or calcium or magnesium.

Y is preferably an integer from 3 to 30 and especially from 4 to 20. x and n are, independent from each other, preferably 1.

Specific homopolymers of formula I include:
when x=1, n=1;
polymethyleneglutaric acid or its salts;
when x=1, n=2;
polymethyleneadipic acid or its salts;
when x=1, n=3;
polymethylenepimelic acid or its salts;
when x=2, n=1;
the polymer derived from

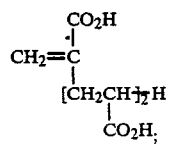

when x=2, n=2,
the polymer derived from

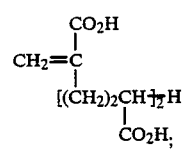

when x=2, n=3,
the polymer derived from

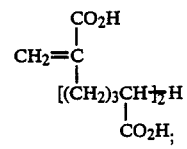

when x=3, n=1,
the polymer derived from

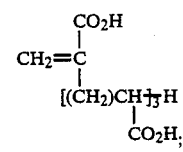

when x=3, n=2,
the polymer derived from

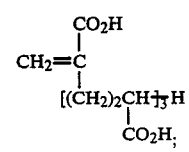

when x=3, n=3,
the polymer derived from

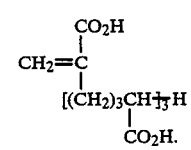

Copolymers of formula I result when x in formula I has more than one value, e.g. when x is 1 or 2, in the same molecule.

One specific example of such a copolymer is that in which in formula I, some units have a value of x equal to 1, and other units have a value of x equal to 2, and n is 1 viz. copolymers derived from a mixture of methyleneglutaric acid and

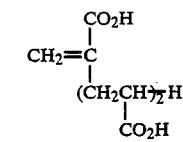

By varying the respective proportions of methyleneglutaric acid and its comonomer, the composition of the resulting copolymer can be modified accordingly.

The present invention also provides a process for the production of a (co)polymer of formula I comprising polymerising, in the presence of a polymerisation catalyst, y moles of a monomer having the formula II:

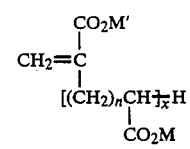

or anhydrides thereof wherein n, x and y have their previous significance and M' has the same significance as M wherein M has its previous significance, or M' is a carboxyl-protecting group e.g. an ester group or an anhydride group; and optionally converting any group M' into a group M.

The catalyst used may be a free radical initiator such as a peroxide e.g. hydrogen peroxide, benzoyl peroxide, acetyl peroxide, di-t-butyl peroxide, a per-sulphate or azobisisobutyronitrile, or a redox or heavy metal polymerisation initiator.

The reaction may be effected in the presence of a solvent. If a solvent is used, it may be a solvent which is reactive or non-reactive. Examples of suitable solvents include aromatic hydrocarbons such as toluene or xylene; aliphatic alcohols such as methanol, ethanol or isopropanol; aliphatic ketones such as acetone, methyl ethyl ketone or methyl isobutyl ketone.

When, in monomer reactants of formula II, M' is a carboxyl-protecting group, this protecting group may be replaced, in the resulting copolymer of formula I, by M by conventional carboxyl de-protection methods, e.g. hydrolysis using water under acidic or basic conditions.

The monomer starting materials of formula II are known materials and may be prepared by conventional methods. For example, methylene glutaric acid may be produced from (a) methylene glutaronitrile which, in turn, is obtainable by dimerisation of acrylonitrile; (b) from dimethyl- or diethyl methylene glutarate which is obtainable from the dimerisation of acrylic acid or (c) anhydride may be obtained from methylene glutaric acid by conventional techniques used in formation of cyclic anhydrides e.g. heating the acid with acetic anhydride. In the production of monomers of formula II, dimerisations are conveniently effected in the presence of catalysts such as pohosphines e.g. tri-n-butyl phosphine, or phosphoramides e.g. hexamethyl phosphoric triamide. Where necessary, hydrolysis of ester groups to the corresponding carboxyl groups can be effected in the presence of acid or base. According to the present invention, there is also provided a composition comprising:

(A) an aqueous system in contact with a metal surface; and (B) as scale inhibitor and/or corrosion inhibitor for the metal surface, especially a ferrous metal surface, a (co)polymer of formula I, as hereinbefore defined.

The present invention still further provides a method of inhibiting corrosion of and/or scale deposition on to a metal surface, especially a ferrous metal surface, in contact with an aqueous system, comprising adding to the aqueous system a protecting amount of a (co)polymer of formula I as hereinbefore defined.

The amount of the (co)polymer of formula I which is present in the aqueous composition, or which is added to the aqueous system is conveniently within the range of from 0.1 to 1000 ppm, preferably from 1 to 100 ppm, especially 2 to 50 ppm based on the aqueous composition or aqueous system.

When performing their scale-control role, the (co)polymers of formula I are effective in inhibiting deposition of e.g. calcium carbonate, calcium sulphate, calcium phosphate, magnesium hydroxide and barium sulphate scales, and in dispersing scale in circumstances in which deposition of such scales has already occurred.

With respect to aqueous systems which may be treated according to the present invention, of particular interest are cooling water systems, steam generating systems, sea-water evaporators, hydrostatic cookers, gas scrubbing systems, closed circuit heating systems, aqueous machining fluid formulations (e.g. for use in boring, milling, reaming, broaching, drawing, turning, cutting, sawing, grinding, and thread-cutting operations or in non-cutting shaping in spinning, drawing or rolling operations), aqueous scouring systems, aqueous glycol antifreeze systems, water/glycol hydraulic fluids; and aqueous based polymer surface-coating systems.

The (co)polymer of formula I, although exhibiting itself metal protectant properties may, nonetheless, be used in conjunction with other compounds known to be useful in the treatment of aqueous systems.

In the treatment of substrates which are completely aqueous, such as cooling water systems, air-conditioning systems, steam-generating systems, sea-water evaporator systems, hydrostatic cookers, and closed circuit heating or refrigerant systems, further corrosion inhibitors may be used such as, for example, water soluble zinc salts; phosphates; polyphosphates; phosphonic acids and therir salts, for example, 2-hydroxyphosphonoacetic acid, hydroxyethyldiphosphonic acid (HEDP) nitrilotris methylene phosphonic acid and methylamino dimethylene phosphonocarboxylic acids and their salts, for example, those described in German Offenlegungsschrift No. 2632774, 2-phosphonobutane-1,2,4-tricarboxylic acid and those disclosed in GB No. 1572406; nitrates, for example sodium nitrate; nitrites e.g. sodium nitrite; chromates e.g. sodium chromate, molybdates e.g. sodium molybdate; borates e.g. sodium borate, tungstates; e.g. sodium tungstate, silicates e.g. sodium silicate; benzoic acid and its salts, benzotriazole, bis-benzotriazole or copper deactivating benzotriazole or tolutriazole derivatives or their Mannich base derivatives; mercaptobenzothiazole; N-acyl sarcosines; N-acylimino diacetic acids; ethanolamines; fatty amines; and polycarboxylic acids, for example, polymaleic acid and polyacrylic acid, as well as their respective alkali metal salts, copolymers of maleic anhydride, e.g. copolymers of maleic anhydride and sulfonated styrene, copolymers of acrylic acid e.g. copolymers of acrylic acid and hydroxyalkylated acrylic acid, and substituted derivatives of polymaleic and polyacrylic acids and their copolymers. Moreover, in such completely aqueous systems, the (co)polymer of formula I used according to the invention may be used in conjunction with dispersing and/or threshold agents e.g. polymerised acrylic acid (or its salts), phosphinopolycarboxylic acids (as described and claimed in British Patent No. 1458235), the cotelomeric compounds described in European Patent Application No. 0150706, hydrolysed polyacrylonitrile, polymerised methacrylic acid and its salts, polyacrylamide and co-polymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxyacrylate copolymers e.g. those described in U.S. Pat. No. 4029577, styrene/maleic anhydride copolymers and sulfonated styrene homopolymers e.g. those described in U.S. Pat. No. 4374733 and combinations thereof. Specific threshold agents, such as for example, 2-phosphonobutane-1,2,4-tri-carboxylic acid (PBSAM), hydroxyethyldiphosphonic acid (HEDP) hydrolysed polymaleic anhydride and its salts, alkyl phosphonic acid, 1-aminoalkyl-1, 1-diphosphonic acids and their salts, and alkali metal poly-phosphates, may also be used.

Particularly interesting co-additive packages are those comprising the (co)polymers of formula I of the invention with one or more of polymaleic acid or polyacrylic acid or their copolymers, or substituted copolymers, HEDP, PBSAM, 2-hydroxyphosphonoacetic acid, triazoles such as tolutriazole, molybdates and nitrites.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones eg polydimethylsiloxanes, distearylsebacamides, distearyl adipamide and related products derived from ethylene oxide and/or propylene oxide condensations, in addition to fatty alcohols, such as capryl alcohols and their ethylene oxide condensates; and biocides eg amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents, bromine and bromine release agents, ozone, and organometallic compounds such as tributyl tin oxide, may be used.

The aqueous system treated may be merely partly aqueous e.g. an aqueous machining fluid formulation, e.g. a water dilutable cutting or grinding fluid.

The aqueous machining fluid formulations treated according to the invention may be e.g. metal working formulations. By "metal working" we mean reaming, broaching, drawing, spinning, cutting, grinding, boring, milling, turning, sawing, non-cutting shaping, rolling or quenching. Examples of water-dilutable cutting or grinding fluids into which the corrosions inhibiting compound may be incorporated include:

(a) Aqueous concentrates of one or more corrosions inhibitors, and optionally one or more anti-wear additives which are usually employed as grinding fluids;

(b) Polyglycols containing biocides, corrosion inhibitors and anti-wear additives for cutting operations or grinding;

(c) Semi-synthetic cutting fluids similar to (b) but containing in addition 10 to 25% oil with sufficient emulsifier to render the water diluted product translucent;

(d) An emulsifiable mineral oil concentrate containing, for example, emulsifiers, corrosion inhibitors, extreme pressure/anti-wear additives, biocides, antifoaming agents, coupling agents etc; they are generally diluted with water to a white opaque emulsion;

(e) A product similar to (d) containing less oil and more emulsifier which on dilution gives a translucent emulsion for cutting or grinding operations.

For those partly-aqueous systems treated according to the invention which are aqueous machining fluid formulations, the copolymer of formula I of the invention may be used singly, or in admixture with other additives e.g. known further corrosion inhibitors or extreme-pressure additives.

Examples of other corrosion inhibitors which may be used in these partly aqueous systems, in addition to the (co)polymer inhibitor used according to the invention, include the following groups:

(a) Organic acids, their esters or ammonium, amine, alkanolamine and metal salts, for example, benzoic acid, p-tert-butyl benzoic acid, disodium sebacate, triethanolamine laurate, iso-nonanoic acid, triethanolamine salt of p-toluene sulphonamido caproic acid triethanolamine salt of benzene sulphonamide caproic acid, triethanolamine salts of 5-ketocarboxylic acid derivatives as described in European Patent No. 41927, sodium N-lauroyl sarcosinate or nonyl phenoxy acetic acid;

(b) Nitrogen containing materials such as the following types: fatty acid alkanolamides; imidazolines, for example, 1-hydroxy-ethyl-2-oleyl-imidazolines; oxazolines; triazoles for example, benzotriazoles; or their Mannich base derivatives; triethanolamines; fatty amines, inorganic salts, for example, sodium nitrate; and the carboxy-triazine compounds described in European Patent No. 46139;

(c) Phosphorus containing materials such as the following types: amine phosphates, phosphonic acids or inorganic salts, for example, sodium dihydrogen phosphate or zinc phosphate;

(d) Sulphur containing compounds such as the following types: sodium, calcium or barium petroleum sulphonates, or heterocyclics, for example, sodium mercaptobenzothiazole. Nitrogen containing materials, particularly triethanolamine, are preferred.

Examples of extreme pressure additives which may be present in the systems treated according to the present invention include sulphur and/or phosphorus and/or halogen containing materials, for instance, sulphurised sperm oil, sulphurised fats, tritolyl phosphate, chlorinated paraffins or ethoxylated phosphate esters.

When triethanolamine is present in the aqueous systems treated according to the present invention, it is preferably present in an amount such that the ratio of the copolymer of formula I to triethanolamine is from 2:1 to 1:20.

The partly-aqueous systems treated by the method of the present invention may also be aqueous surface-coating compositions e.g. primer emulsion paints and aqueous powder coatings for metallic substrates.

The aqueous surface-coating composition may be e.g. a paint such as styrene-acrylic copolymer emulsion paint, a resin, latex, or other aqueous based polymer surface-coating systems.

Sodium nitrite and sodium benzoate have been used to inhibit flash rusting of aqueous based primer paints but because of related toxicity problems and problems of emulsion stability at the high ionic concentrations used, industry is moving away from sodium nitrite and sodium benzoate.

In aqueous surface-coating compositions treated according to the invention the (co)polymer of formula I of the invention may be used singly, or in admixture with other additives e.g. known corrosion inhibitors, biocides, emulsifiers and/or pigments.

The further known corrosion inhibitors which may be used are e.g. those of classes (a), (b), (c) and (d) hereinbefore defined.

Examples of biocides which may be used in these aqueous systems, in addition to the compound formula I, include the following:

Phenols, and alkyl- and halogenated phenols, for example pentachlorophenol, o-phenyl phenol, o-phenoxyphenol and chlorinated o-phenoxyphenol, and salicylanilides, diamines, triazines and organometallic compounds such as organomercury compounds and organotin compounds.

Examples of pigments which may be used in these aqueous systems include titanium dioxide, zinc chromate, iron oxide and organic pigments such as the phthalocyanines.

The following Examples further illustrate the present invention. Parts and percentages are by weight unless otherwise stated.

EXAMPLE 1

To a mixture of 36 parts (0.25 moles) of methylene glutaric acid and 100 parts (1.0 moles) of methyl isobutyl ketone, heated to reflux under an atmosphere of nitrogen, is added, dropwise, over 1 hour, a mixture of 1.8 parts (0.012 moles) of di-tert-butyl peroxide in 10 parts (0.1 mole) methyl isobutyl ketone.

When the addition is complete, the mixture is stirred under reflux conditions for 2 hours, in which time the polymer precipitates out.

After cooling to room temperature, the polymer is filtered off, and oven-dried.

Yield of polymer is 21.9 parts and it has a weight average molecular weight of 1820.

EXAMPLE 2

0.1 Part of the polymer produced in Example 1 is dissolved, and made up to 100 ml with distilled water (to give the additive solution).

50 ml of a solution containing sodium carbonate and sodium bicarbonate is mixed with 50 ml solution of calcium chloride and magnesium chloride which already contains the additive solution. The resultant solution, through which air is bubbled at a constant rate, is stored at 70° C. for 30 minutes before it is filtered.

At the end of this time, the calcium remaining in the filtrate is determined by EDTA titration.

The result is expressed as % inhibition I of calcium carbonate precipitation where I is defined by I=(titre-blank titre):(15.0-blank titre)×100 (15.0 is the maximum possible titration for 100% inhibition).

Polymer of Example 1 Av % I=54.5; Dose level=2 ppm; Control Av % I=0.

EXAMPLE 3

0.1 Parts of the polymer of Example 1 is dissolved and made up to 100 mls with distilled water (to give the additive solution).

A 50 ml solution containing sodium sulphate is mixed with 50 ml of a separate solution containing barium and sodium chlorides, to which has been added the additive solution and an acetic acid/sodium acetate buffer to maintain a pH of 5.5 in the test solution.

The resultant solution is stored at 25° C. for 4 hours and is then filtered.

The barium remaining in solution in the filtrate is determined by Atomic Absorption spectrophotometry, after suitable dilution. The result is expressed as % inhibition (I) of barium sulphate precipitation.

Polymer of Example I Av % I=93.0% at dose level 6 ppm; Control Av % I=0.

EXAMPLE 4

The corrosion inhibitor activity of the product of Example 1 is examined in the Rotating Coupon Test using the following standard corrosive water:

|  | 50 Ca |
| --- | --- |
| pH | 7.0 |
| PA | 0 |
| TA | 20 |
| TH | 75 |
| $Ca^{2+}$ (ppm) | 50 |
| $Mg^{2+}$ (ppm) | 25 |
| $Cl^-$ (ppm) | 20 |
| $SO_4^{2-}$ (ppm) | 20 |

In the Table, "PA" denotes phenol alkalinity in ppm as $CaCO_3$; "TA" denotes total alkalinity in ppm as $CaCO_3$; and "TH" denotes total hardness in ppm as $CaCO_3$.

In a 1 liter reservoir of one of the test waters, two-precleaned and pre-weighted mild steel coupons re rotated at a coupon velocity of 61 cms per second. The test is conducted over 48 hours in oxygenated water at 40° C. using 20 ppm of the product of Example 1 as corrosion inhibitor.

The coupons are removed, cleaned and the corrosion rates are determined in milligrams of weight loss/sq. decimeter/day (m.d.d.).

| Example | inhibitor (20 ppm) | corrosion rate (m.d.d.) 50 Ca |
| --- | --- | --- |
| — | none (control) | 275.8 |
| 4 | Product Example 1 | 5.4 |

What is claimed is:

1. (Co)polymers having the formula (I):

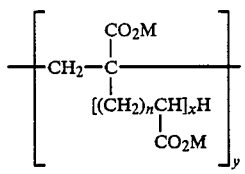

wherein
M is hydrogen, a metal ion or an ammonium cation;
x is 1, 2 or 3;
y is an integer from 2 to 100; and
n is 1, 2 or 3.

2. (Co)polymers according to claim 1 wherein
M is as defined in claim 1;
x is 1;
y is an integer from 3 to 20; and
n is 1.

3. (Co)polymers according to claim 1 wherein M is as defined in claim 1; x and n are as defined in claim 2; and y is an integer from 4 to 20.

4. (Co)polymers according to claim 1 wherein M is an alkali metal or an alkaline earth metal.

5. (Co)polymers according to claim 4 wherein M is sodium or potassium or calcium or magnesium.

* * * * *